United States Patent Office 3,697,437
Patented Oct. 10, 1972

3,697,437
ENCAPSULATION PROCESS BY COMPLEX COACERVATION USING INORGANIC POLYPHOSPHATES AND ORGANIC HYDROPHILIC POLYMERIC MATERIAL
Mark V. Fogle, Lewisburg, Ohio, and Georg Hörger, Steppach, Germany, assignors to The National Cash Register Company, Dayton, Ohio
No Drawing. Filed May 27, 1970, Ser. No. 41,109
Int. Cl. A61k 9/04; B01j 13/02; B44d 1/02
U.S. Cl. 252—316
5 Claims

ABSTRACT OF THE DISCLOSURE

A process is disclosed for manufacturing capsules, en masse, by use of a liquid-liquid phase separation which includes polyphosphate inorganic material as a complexing, phase-separation-inducing, polymer. The disclosed process is conducted in an aqueous capsule manufacturing vehicle and the material which emerges as a liquid phase is an aqueous solution of organic hydrophilic polymeric material and inorganic polyphosphate material. The liquid-liquid phase separation of this invention is the type generally named "complex" coacervation wherein the separated, emergent, liquid phase includes a major portion of both, the organic hydrophilic polymeric material and the phase - separation - inducing material—in this invention, polyphosphate polymeric material. The organic polymeric material and the inorganic polymeric material are complexed together by virtue of opposite electrical charges, the complex is at least partially immiscible with the manufacturing vehicle, and the manufacturing vehicle contains only a minor amount of either polymeric material. Preferred materials for use in practicing the present invention include gelatin as the organic hydrophilic polymeric material and polyphosphates as the inorganic polymeric phase-separation-inducing material.

BACKGROUND OF THE INVENTION

Field of the invention

The present invention relates to a process for conducting a liquid-liquid phase separation having an organic hydrophilic polymeric material as one major polymeric material constituent and an inorganic polymeric material as another major polymeric constituent. The present invention more specifically pertains to a proces for manufacturing a separated liquid phase utilizing a complex of an inorganic polymeric material and an organic polymeric material and further relates to a process for manufacturing minute capsules, en masse, having the above-mentioned complex of materials as capsule wall material. The present invention particularly pertains to a method for manufacturing such separated liquid phase and minute capsules wherein the liquid-liquid phase separation is of the type generally named "complex" coacervation and is conducted utilizing an inorganic polyphosphate polymeric material as a complexing, phase-separation-inducing material.

Minute capsules have long been manufactured by utilizing the effects of complex coacervation. The wall material of capsules made by complex coacervation of the prior art are subject to the effects of moisture and humidity from the ambient environment—such effects causing increased permeability where the quality of impermeability is generally desired. Moreover, capsules so-made have utilized relatively expensive materials. Such capsules are manifestly too expensive to be used in many of the applications for which the benefits of encapsulation would, otherwise, be desired. The process and the capsule product of the present invention utilize relatively inexpensive materials and therefore produce relatively inexpensive capsules.

The present process utilizes a polyphosphate inorganic polymeric material as one component in a capsule manufacturing system which yields a complex coacervate as a capsule wall material—a complex coacervate not before having been accomplished using such an inorganic polyphosphate polymer. Non-polymeric inorganic materials have been previously used to manufacture separated phases of organic hydrophilic polymeric materials for use in capsule walls. In so-called "simple coacervation" of the prior art, the major amount of capsule wall material has been organic hydrophilic polymeric material of a single kind. A considerable proportion of contaminant non-polymeric, inorganic, phase-separation-inducing material is normally present in practice of that simple coacervation. It is now possible, by the process of the present invention, to manufacture minute capsules by a method of complex coacervation wherein an inorganic polymeric material is utilized and is not a contaminant but takes an active part as a component of the capsule walls by being complexed to the organic hydrophilic polymeric material. The inorganic material above-referenced, is an electrically-charged inorganic polyphosphate material which is soluble in an aqueous liquid manufacturing vehicle and which is utilized, according to the process of the present invention, as a complexing, phase-separation-inducing material. Said inorganic polyphosphate material is an important component of capsule walls manufactured by the complex coacervation of the present invention and, by a mechanism not well understood, improves the quality of the capsule walls.

Description of the prior art

U.S. Pat. No. 2,800,457, issued July 23, 1957 on the application of Barrett K. Green and Lowell Schleicher and assigned to the assignee herein, discloses that organic hydrophilic polymeric materials can be caused to emerge from solution in aqueous capsule manufacturing vehicles by being complexed with other organic hydrophilic polymeric materials to decrease the solubility of the polymeric materials as they are complexed in the capsule manufacturing vehicle. In the disclosed process of that patent, the emergent phase includes the major portion of both the organic hydrophilic polymeric material to be separated from solution and the organic, complexing, phase-separation-inducing material. The remaining aqueous liquid manufacturing vehicle of that patent contains very little of either of the organic hydrophilic polymeric materials. The process of that patent relates to the process of the present invention in that it discloses complex coacervation for manufacturing minute capsules, en masse.

U.S. Pat. No. Re. 24,899, issued on Nov. 29, 1960, on the application of Barrett K. Green and assigned to the assignee herein discloses that organic hydrophilic polymeric material can be caused to undergo simple coacervation from aqueous solution by the addition to that solution of a simple inorganic salt such as ammonium sulfate. That patent discloses a method for making microscopic capsules having walls of a single kind of gelable hydrophilic polymeric material. There is mention, in that patent, of a desirability to remove residual salt from the phase-separated organic hydrophilic polymeric material by washing the polymeric material after phase separation has been accomplished, but there is no mention of complexing of inorganic material with the organic polymeric material to yield a separated liquid phase.

A textbook titled "Colloid Science II," edited by H. R. Kruyt, and published by the Elsevier Publishing Company, New York (1949), contains extensive disclosure of complex coacervation and yet does not disclose that complex coacervation can be accomplished using inorganic polymeric materials. The textbook, "Colloid Science II," also discloses the existence of residual inorganic salt in phase-separated hydrophilic polymeric material which, when dried into films of coacervate is retained as a contaminant to the film.

Several other patents in the prior art, such as British Pat. No. 920,868, granted Mar. 13, 1963, on the declaration of The National Cash Register Company, disclose phase separation processes wherein simple inorganic salts are utilized to accomplish liquid-liquid phase separation of the simple coacervation type. In that British Pat. No. 920,868, a sulfate salt is utilized as the phase-separation-inducing material to accomplish liquid-liquid phase separation of a pigskin gelatin from aqueous solution.

SUMMARY OF THE INVENTION

"Complex coacervation" includes a process wherein at least two oppositely electrically-charged hydrophilic polymeric materials are caused to emerge from aqueous solution by being mutually attracted to and complexed with one another and by, thereby, having their solubility in the aqueous manufacturing vehicle decreased. In the instance of complex coacervation, the emergent phase contains substantially all of the electrically-charged hydrophilic polymeric material utilized in forming the complex.

"Simple coacervation" includes a process wherein a single kind of hydrophilic polymeric material is caused to emerge from aqueous solution as a part of a separated liquid phase, by addition to the system, of some non-complexing phase-separation-inducing material. The emergent phase contains a relatively high concentration of the hydrophilic polymeric material and that hydrophilic polymeric material does not rely solely on electrical charge or on complexing to sustain the phase separation.

The process of this invention pertains specifically to complex coacervation as it is defined above, and as it is known in the prior art. However, in prior processes for manufacturing capsule walls by complex coacervation, electrically-charged organic hydrophilic polymeric materials have been used for both components of the complex. Also, in the processes of the prior art relating to liquid-liquid phase separation wherein inorganic salts are utilized, the phase separation has been disclosed to be of the simple coacervation kind. Such processes of simple coacervation have required the use of relatively high concentrations of simple inorganic salts and the salts remain in high concentration in the separated phase as well as in the continuous phase of the manufacturing vehicle. In manufacturing capsules, such relatively high concentrations of salt tend to remain in the capsule wall material and adversely affect the permeability of the capsule walls. Moreover, such salt contaminants are believed to cause sensitivity to humidity and moisture.

Complex coacervation of the present invention has several advantages over the complex coacervation of the prior art. Although high quality gelatins are customarily used in both types of coacervation, the complex coacervation of the present invention can make use of relatively inexpensive inorganic polymeric polyphosphates as the complexing phase-separation-inducing material while the complex coacervation of the prior art requires relatively expensive, organic polymeric complexing materials such as gum arabic or carrageenan.

Accordingly, it is an object of the present invention to provide a process for performing complex coacervation of organic hydrophilic polymeric material utilizing an electrically-charged inorganic polymer of polyphosphate as the complexing, phase-separation-inducing material. It is an additional object of the present invention to provide a process for manufacturing, en masse, minute capsules utilizing the above-described complex coacervation process and the inorganic polymeric polyphosphate material as a complexing component of the capsule wall material.

It is another object of the present invention to provide minute capsules having improved impermeability, decreased sensitivity to moisture and humidity at ambient conditions and which require less expensive complexing phase-separation-inducing material in their manufacture. Another object of the present invention is to provide a process for making improved capsules by means of a novel complex coacervation wherein organic hydrophilic polymeric material can be of a lower quality and therefore less expensive than such hydrophilic polymeric materials used in the past.

It is important to note, and should be understood, that the process of the present invention pertains to complex coacervation; and that the inorganic polyphosphate material which forms a part of the coacervate capsule walls is complexed with the organic polymeric material of the capsule walls as a natural consequence of the process of performing the phase separation. In this, improved, process for accomplishing complex coacervation, the polyphosphate material is polymeric in nature and does not adversely affect the capsule wall properties. Inorganic polyphosphate material complexed in the emergent phase with organic hydrophilic polymeric material according to the present invention, has been found to provide capsule walls of improved quality.

The system resulting from the complex coacervation of the present invention comprises the separated phase which is, as was stated above, concentrated with regard to the complex of organic hydrophilic polymeric material and inorganic polymeric material. The remaining continuous manufacturing vehicle phase is relatively dilute in polymeric materials—such being true by the very definition of the term "complex coacervation" wherein two kinds of polymeric materials are combined as a complex by the attraction of opposite electrical charges.

The process of the present invention can be summarized as comprising the following steps:

(a) preparing a liquid capsule manufacturing system by mixing an aqueous solution of organic hydrophilic polymeric material with an aqueous solution of electrically-charged inorganic polymeric polyphosphate material—the mixture yielding a two-phase system comprising a continuous liquid phase relatively dilute in polymeric material and a discontinuous liquid phase of a multitude of dispersed droplets of an emergent phase relatively concentrated in a complex of the inorganic polymeric polyphosphate material and the organic hydrophilic polymeric material;

(b) dispersing, into the capsule manufacturing system, a multitude of minute, intended capsule core entities; and (c) maintaining the system for a time adequate to permit the dispersed intended capsule core entities to be wet and enwrapped by the dispersed droplets of the emergent phase.

All of the components of the present capsule manufacturing system, including the intended capsule internal phase can, if desired, be combined into a single vessel, aqueous liquid added to yield solutions of the soluble components, and agitation continued to manufacture capsules, all in one continuous step. Such a system can be considered to be a "pre-mix" of an encapsulation system. It should be understod that the intended capsule core material must be substantially insoluble in the capsule manufacturing vehicle and it should be further understood that the capsules or the capsule product of the novel encapsulating system is obtained when the dispersed capsule core entities have been wet and individually enwrapped by the emergent liquid phase. Such capsules can then be considered to be embryonic, liquid-walled, capsules and can, optionally, be subjected to further treatment in which the embryonic capsule wall material is further hardened. The additional treatment can comprise a simple lowering of the temperature or any of several other capsule wall material hardening treatments well-known in the art.

A special feature of the process of the present invention and what is particularly considered to be novel resides in the use of electrically-charged inorganic polyphosphate material as a complexing, phase-separation-inducing material in providing complex coacervation with an organic hydrophilic polymeric material.

Organic hydrophilic polymeric materials which are generally eligible for use in the practice of the present invention include any electrically-charged, film-forming polymeric material soluble in an aqueous capsule manufacturing vehicle. The organic hydrophilic polymeric material generally has a net positive charge under conditions of encapsulation. Among such organic hydrophilic polymeric materials can be listed: gelatin; poly(vinyl pyrrolidone); poly(ethyleneimine); and albumin, to mention a few representative examples.

Inorganic polyphosphate materials which are eligible for use in the practice of the present invention generally include any such polymeric material which carries a net electrical charge (the charge usually being negative) and which is soluble, in sufficient quantity, in the aqueous liquid of the phase separation manufacturing vehicle. Preferred, among the eligible inorganic polyphosphate materials are alkali metal phosphates and phosphate glasses; specifically preferred are alkali metal hexametaphosphates such as sodium hexametaphosphate.

Solvents eligible for use as manufacturing vehicle in the practice of the present invention are aqueous liquids having relatively high dielectric constants. The preferred solvent is water, but mixtures of water with alcohol, water with acetone, or mixtures of water with another organic liquid solvent wholly or partially miscible in water are generally eligible. The additional organic liquid solvent utilized with water in the process of the present invention must be of an amount such that the combination of water and the additional organic solvent will still exhibit adequate dissolving powder with respect to the polymeric materials. One reason for utilizing additional organic solvents in the manufacturing vehicle is that presence of an additional solvent permits alteration of the emergent phase viscosity. Alteration of the viscosity of the emergent liquid phase in this way, permits the use of a wider variety of capsule wall materials and permits an additional control in the size of capsules manufactured.

Capsule internal phase material in capsules of the present invention can be any of a multitude of different kinds and types of materials. The most important criteria in selection of the materials which are eligible for being encapsulated are: (a) that the intended internal phase material be substantially insoluble in the capsule manufacturing vehicle and (b) that the intended capsule internal phase material be substantially non-reactive with other components of the capsule manufacturing system. A few of the materials which can be utilized as capsule internal phases include, among a multitude of others: water insoluble or substantially water insoluble liquids, such as olive oil, fish oils, vegetable oils, sperm oil, mineral oil, xylene, toluene, benzene, kerosene, chlorinated biphenyl, and methyl salicylate; substantially water insoluble metallic oxides and salts; fibrous materials, such as cellulose or asbestos; substantially water insoluble synthetic polymeric materials; minerals; pigments; glasses; elemental materials, including solids, liquids and gases; flavors, fragrances; reactants; biocidal compositions; physiological compositions; fertilizer compositions, and the like. In short, the materials which can be contained in capsules manufactured by the process of the present invention, can differ not only among themselves in their physical state, which can be solid, liquid, gas, or combinations thereof, but can differ in their chemical composition and in their intended use. The capsule wall materials in the present invention provide increased protection for the capsule internal phase materials, such as, protection from ambient conditions, protection from oxidation or ultraviolet radiation, protection from evaporation, from crystallization in solution, and the like.

The capsule walls, once formed, can be hardened by gelling (that is, by lowering the temperature) or they can be hardened by chemical reaction or complexing. The chemical hardening or complexing can be achieved by relatively well-known hardening agents for the organic hydrophilic polymeric material. Such hardening agents eligible for use include formaldehyde, glutaraldehyde, acroleine, glyoxal, cinnamaldehyde, tannin, and several others exhibiting like effect on the organic polymeric material, either in solution or in aqueous contact. Of course, the capsules can be used without the additional step of chemical hardening.

Capsules made according to the process of the present invention are substantially spherical, have seamless walls, and are not limited either as to size or as to internal phase contents. The broad range of internal phase contents was hereinabove disclosed and the size range of capsules made by the present invention can extend from a lower limit of a few to several microns up to a larger limit of several thousand microns in average diameter. The usual sizes, for capsules made according to the present process are from about one or two microns to about 15,000 microns in average diameter. Capsules of the aforementioned size are considered to be minute and are preferred. The most usual size for capsules manufactured according to the present invention is within a range of from about five microns up to about 2,500 microns. Capsules made according to the present invention can be made to contain a range of amounts of internal phase material from 0 to more than 99 percent, by weight. The most usual and preferred range for the amount of material to be contained in the capsules is from about 50 to about 97 percent, by weight.

With respect to conditions for capsule manufacturing systems utilizing either simple or complex coacervation, the following ratios and ranges have been found to be useful as an initial guide in characterizing the particular manufacturing systems. The systems can be divided into solids content and ratio of organic polymeric material to inorganic polymeric material. In a system utilizing gelatin, for example, as the organic polymeric capsule wall material, the weight ratio of organic solid material to inorganic solid material is usually less than about 2 and preferably less than about 1 in simple coacervation and is usually greater than about 2 and preferably in a range of about 2 to 22, or perhaps slightly larger, for the case of complex coacervation.

The inorganic polyphosphate materials eligible for use in the complex of the present invention include hydrolyzed phosphates and water soluble phosphate glasses of several varieties. Although the present invention is not limited as to the pH for the capsule manufacturing system, the preferred pH for complex coacervation of polyphosphates with gelatins is less than about 6 and, most preferably from about 4 to about 5.

DESCRIPTION OF PREFERRED EMBODIMENT

Example 1

To a vessel equipped for agitation and heating the following are added to form a liquid system: 900 milliliters of 2 percent, by weight, aqueous gelatin solution wherein the gelatin is of the acid-extracted pigskin variety having an isoelectric point of approximately 8–9 pH and a Bloom strength of about 285 to 305 grams; 100 milliliters of 2 percent, by weight, aqueous solution of sodium hexametaphosphate for example, a polyphosphate sold under the trademark "Calgon" by the Calgon Corporation, Pittsburgh, Pa., U.S.A., having a minimum of 67 percent, by weight, $P_2O_5$ and an empirical formula $Na_{16}P_{24}O_{43}$. A complex forms in the liquid system and a complex coacervate emerges from solution as dispersed liquid droplets.

The internal phase material for use in the present example can be corn oil and 160 milliliters of that oil is added to the agitating capsule manufacturing vehicle and is dispersed to an average droplet size of about 100–500 microns in diameter.

The system, which was initially at an increased temperature of approximately 50 degrees centigrade is permitted to cool to approximately 25 degrees centigrade. The system is then chilled in an ice bath to approximately 10 degrees centigrade to gel the gelatin/polyphosphate capsule wall material complex and to complete formation of the capsules. If desired, the capsule walls can be chemically hardened such as by the addition of approximately 10 milliliters of a 25 percent, by weight, aqueous glutaraldehyde solution, but such chemical hardening is not necessary for the practice of the present invention.

The pH of the above encapsulating system remains unadjusted throughout the process and is the natural solution pH of the materials alone and in combinations. The pH of the encapsulating system of this invention, that is, the system which utilizes complex coacervation is preferredly maintained between about 4.3 and 5.0 in order to maintain the correct electrical charge balance between the organic hydrophilic polymeric material and the inorganic polyphosphate.

Example 2

The technique of Example 1 is repeated using the same kinds and amounts of materials with the exception that the polyphosphate material of Example 1 is substituted in Example 2 by a material which carries the trademark, "Hy Phos" sold by the Hooker Chemical Corporation, Niagara Falls, N.Y., U.S.A., having an empirical formula of $Na_{12}P_{10}O_{31}$ and a minimum content of $P_2O_5$ of about 65 percent, by weight.

Example 3

The following are added to a vessel equipped for agitation and stirring: 100 milliliters of 10 percent, by weight, aqueous gelatin solution having a temperature of about 80 degrees centigrade wherein the gelatin has a Bloom strength of about 240 grams; 100 milliliters of water and 2 milliliters of a 25 percent, by weight, aqueous solution of polyphosphate polymeric material (for example, a high molecular weight material, such as sold under the trademark of "Hexatren C-60" by Gebr. Giulini G.m.b.H., 6700 Ludwigshafen/Rhine, Giulinistr, 2, Germany). The pH of the system is adjusted to about 5.05 and the temperature is adjusted to about 60–65 degrees centigrade. It is noted that liquid-liquid phase separation has occurred at this point.

Intended internal phase material, for example, tetranitromethane, is then dispersed into the system and the system is permitted to cool slowly to room temperature. During the cooling, liquid droplets of the separated phase of capsule wall material wet and enwrap the dispersed capsule internal phase to yield embryonic capsules. The capsule wall material can be chemically hardened by adding about 5 milliliters of 25 percent, by weight, aqueous glutaraldehyde solution.

The system is agitated for several hours, the capsule manufacturing liquid is decanted and the capsules are dispersed and stirerd for several hours in a saturated aqueous solution of sodium sulfate. The capsules are filtered and dried in air.

Example 4

The following are added to a vessel equipped for agitation and heating: 90 milliliters of 10 percent, by weight, gelatin having a Bloom strength of about 170 to 175 grams; 100 milliliters of water; and 2.7 milliliters of 25 percent, by weight, aqueous solution of polyphosphate material (for example, the material identified in Example 3, above). The pH is adjusted to about 4.55 and the capsules are manufactured according to the process steps outlined hereinbefore in Example 3.

Example 5

In this example, the above Example 4 is repeated with the exception that the gelatin has a Bloom strength of about 120 grams.

It should be understood that any of a variety of polyphosphate materials could be utilized in the above examples. For instance, in Examples 3, 4 or 5 the high molecular weight polyphosphate could be replaced by medium molecular weight material (as sold under the trademark "Hexatren R" by Gebr. Giulini) or low molecular weight material (as sold under the trademark "Hexatren N" also by Gebr. Giulini).

What is claimed is:

1. A process for manufacturing minute capsules, en masse, in an aqueous liquid capsule manufacturing vehicle comprising the steps of:
  (a) mixing an aqueous liquid solution of an electrically charged organic hydrophilic polymeric material and an aqueous liquid solution of an oppositely electrically-charged inorganic polyphosphate polymeric material to yield the aqueous capsule manufacturing vehicle which comprises:
    (i) a continuous aqueous liquid phase relatively dilute in both of the polymeric materials and
    (ii) a discontinuous aqueous liquid phase of a multitude of dispersed droplets relatively concentrated in both of the electrically-charged polymeric materials complexed together to serve as capsule wall material;
  (b) dispersing into the capsule manufacturing system, a multitude of minute intended capsule core entities substantially insoluble in the liquid of the phases; and
  (c) maintaining the mixing for a time sufficient to permit dispersed droplets of the complexed capsule wall polymeric materials to wet and individually enwrap the intended capsule core entities to yield capsules.

2. In a process for manufacturing minute capsules, en masse, in an aqueous liquid capsule manufacturing vehicle comprising the steps of:
  (a) establishing an agitating three-phase aqueous liquid capsule manufacturing system wherein a major proportion of the system comprises
    (i) a continuous phase of aqueous liquid,
    (ii) a minor proportion of the system is a discontinuous phase of minute mobile particles of intended capsule core entities and,
    (iii) a minor proportion of the system is a discontinuous phase of liquid globules of capsule wall material,
  the intended capsule core entities being wettable by the capsule wall material, the three phases being substantially mutually immiscible, and the liquid globules of capsule wall material being present in sufficient volume to wet and enwrap the capsule core entities and comprising a complexed combination of at least two electrically-charged polymeric materials; and
  (b) hardening the capsule wall material wetting and enwrapping the capsule core entities—
    the improvement which comprises effecting establishment of the phase including capsule wall material by complex coacervation of an electrically-charged organic hydrophilic polymeric material using inorganic polyphosphate material.

3. The process of claim 2 wherein the organic hydrophilic polymeric material is gelatin.

4. In a process for manufacturing minute capsules, en masse, including a complex coacervate of oppositely-charged polymeric materials comprising the steps of: dissolving at least two oppositely electrically-charged hydrophilic polymeric materials in an aqueous manufacturing vehicle and adjusting conditions in the vehicle to yield an emergent liquid phase of a complexed combination of the hydrophilic materials: the improvement which comprises utilizing an electrically-charged inorganic polyphosphate polymeric material as one of the hydrophilic polymeric materials of the capsule-wall-forming complex coacervate and utilizing electrically-charged organic polymeric material as the remaining hydrophilic polymeric materials of the complex coacervate.

5. The process of claim 4 wherein at least one of the electrically-charged hydrophilic polymeric materials of the complex coacervate is gelatin.

References Cited
UNITED STATES PATENTS

| | | | |
|---|---|---|---|
| 2,800,457 | 7/1957 | Green et al. | 252—316 |
| 3,112,274 | 11/1963 | Morgenthaler et al. | 252—99 |
| 3,415,758 | 12/1968 | Powell et al. | 252—316 |

RICHARD D. LOVERING, Primary Examiner

U.S. Cl. X.R.

117—62.2, 100 A, 100 B; 260—113; 264—4; 424—16, 32, 33, 36, 37